United States Patent [19]
Bachman

[11] 3,826,139
[45] July 30, 1974

[54] LIQUID LEVEL INDICATING APPARATUS
[75] Inventor: Albert J. Bachman, Bristol, Conn.
[73] Assignee: DeLaval Turbine, Inc., Princeton, N.J.
[22] Filed: Mar. 19, 1973
[21] Appl. No.: 342,877

[52] U.S. Cl.................... 73/311, 73/313, 200/84 C
[51] Int. Cl.......................... G01f 23/10, G01f 23/12
[58] Field of Search................ 73/311, 313, DIG. 5; 200/84 C; 340/244 A

[56] References Cited
UNITED STATES PATENTS
3,419,695  12/1968  Dinkelkamp et al.............. 200/84 C
3,678,750  12/1968  DiNoia................................ 73/313

Primary Examiner—S. Clement Swischer
Attorney, Agent, or Firm—McCormick, Paulding & Huber

[57] ABSTRACT

A liquid level indicating apparatus provides remote digital indication of liquid level in a tank or the like and comprises a plurality of discrete liquid level indicating stations releasably mounted at vertically spaced intervals along a wall of the tank and connected together in electrical series by elongated flexible electrical conductors to define a voltage divider for transmitting electrical signals to a receiver or indicating meter. Each station has a float which carries permanent magnets and moves vertically between stops in response to a predetermined liquid level condition in the tank to operate a magnetically responsive tap switch, whereby to alter the effective electrical resistance of the voltage divider.

14 Claims, 6 Drawing Figures

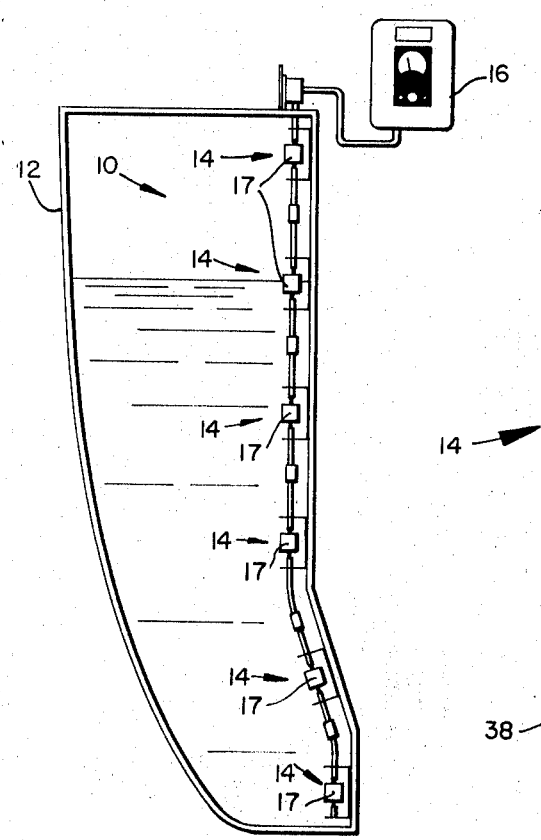
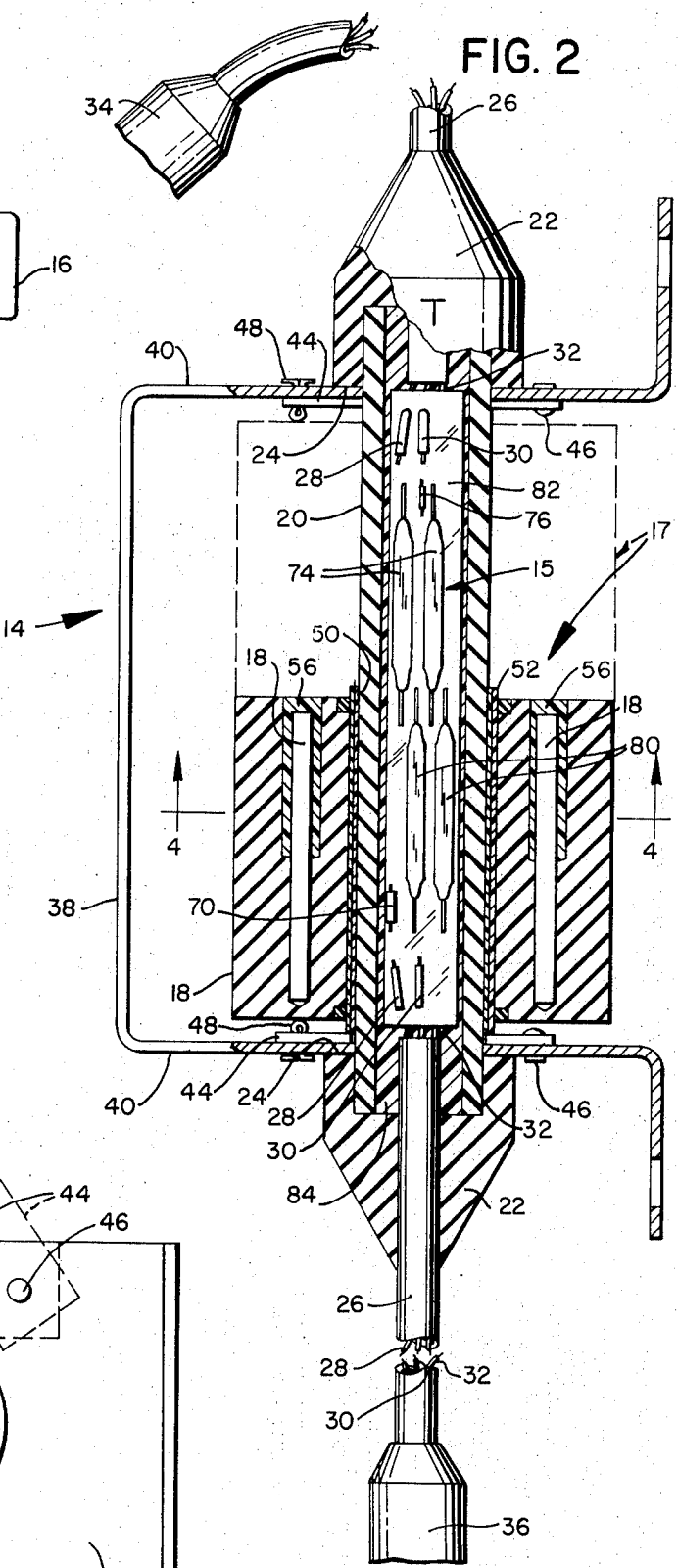
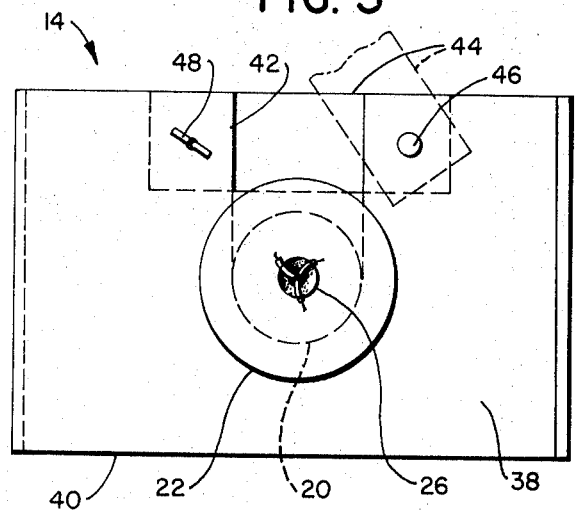
FIG. 1
FIG. 2
FIG. 3

LIQUID LEVEL INDICATING APPARATUS

BACKGROUND OF THE INVENTION

This invention relates in general to liquid level indicating apparatus and deals more particularly with electrically operated apparatus of variable voltage type for positioning in a container or tank to provide remote digital indication of liquid levels therein.

Heretofore, various incremental liquid level sensing devices have been provided which include permanently or semipermanently interconnected indicating stations arranged in vertical series and mounted in fixed position within a tank or the like to interface with liquid therein. Such apparatus may present problems in installation and calibration when mounted in a tank having a non-linear capacity curve, that is, a tank in which even increments of tank height do not correspond to even increments of liquid quantity. The present invention is concerned with improvements in apparatus of the aforedescribed type. More specifically, it is the general aim of the present invention to provide an improved digital sensing or indicating apparatus of rugged durable construction for facile installation and rapid and accurate calibration in a tank of any shape to indicate any increment or range of increments of liquid level therein and which may be rapidly, conveniently serviced.

SUMMARY OF THE INVENTION

In accordance with the present invention, an improved liquid level indicating apparatus is provided which includes a plurality of discrete liquid level indicating stations flexibly interconnected to facilitate rapid installation and calibration and to permit convenient removal of individual stations for servicing or replacement. An improved circuit arrangement assures accurate reliable digital liquid level indication.

BRIEF DESCRIPTION OF THE DRAWINGS

FIG. 1 is a vertical sectional view through a tank of a vessel or the like and shows a liquid level indicating apparatus embodying the present invention mounted on a wall thereof.

FIG. 2 is a somewhat enlarged side elevational view of a liquid level indicating station which comprises a part of the apparatus of FIG. 1 shown partially in vertical axial section.

FIG. 3 is a plan view of the liquid level indicating station of FIG. 2.

DETAILED DESCRIPTION OF PREFERRED EMBODIMENT

Figure 4:
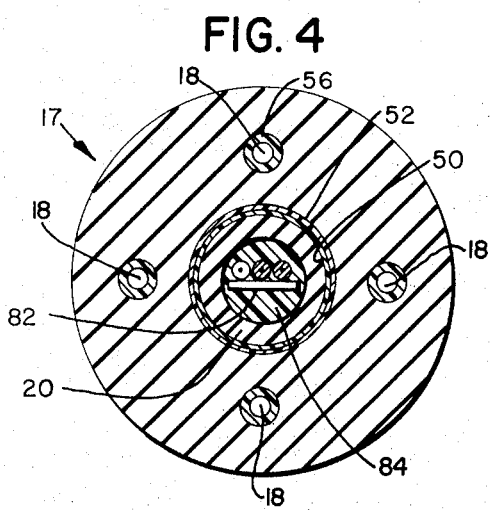
FIG. 4 is a sectional view taken generally along the line 4—4 of FIG. 2.

Turning now to the drawing and referring first particularly to FIG. 1 thereof, a liquid level indicating apparatus embodying the present invention and indicated generally by the reference numeral 10, is shown mounted on a wall of a tank 12 which contains a quantity of liquid and, which may, for example, comprise a fuel tank of a ship or the like. The apparatus 10 generally comprises a plurality of discrete liquid level indicating stations 14, 14 mounted at vertically spaced intervals along a wall of the tank 12. The individual indicating stations 14, 14, connected together in electrical series by flexible electrical conductors, cooperatively form a voltage divider circuit for transmitting signals to a receiver or meter 16 which senses change in the condition of the divider circuit and which may, if desired, be located at a remote monitoring station. Each indicating station 14 is positioned in the tank to respond to a predetermined liquid level therein and contains a magnetically responsive upper or tap switch, indicated generally at 15 in FIG. 2, for changing the electrical output of the voltage divider circuit to alter the signal transmitted to the receiver 16 when the liquid in the tank reaches said predetermined level. The tap switch 15 is operated by a float indicated generally at 17 which carries one or more magnets such as indicated at 18, 18, and is supported for limited vertical movement relative to the latter switch. The manner in which the indicating stations 14, 14 are supported in the tank 12 and connected to each other facilitates rapid installation and convenient servicing and replacement of individual indicating stations, as will be hereafter evident.

Referring now particularly to FIGS. 2–5, a typical indicating station 14 has an elongated hollow tubular body 20 which may be made from any suitable material compatible with the liquid to be guaged. In the illustrated case, the body 20 has a generally cylindrical shape and is made from synthetic rubber. The body 20 also includes enlarged end caps 22, 22 of molded synthetic rubber which provide closures for the upper and lower ends of the tubular portion thereof and define opposing annular abutment surfaces 24, 24 as shown in FIG. 2.

An elongated flexible electrical conduit 26 contains electrical conductors 28, 30 and 32 and is connected to the upper switch 15 and to other circuit components contained in the body 20 and hereinafter further described. The conduit is bonded or otherwise attached to the end caps 22, 22 and forms integral extensions thereof. One portion of the conduit 26 extends axially outwardly for some distance from the upper end cap 22 and has a connector 34 at the end thereof. Another elongated portion of the conduit 26 extends axially outwardly from the lower end cap 22 and has another connector 36 at its end. The connectors 34 and 36 are preferably molded on or otherwise integrally connected to the conduit 26 and contain electrical connections whereby the station 14 is connected with other stations 14, 14 or with a receiver.

A mounting bracket 38 releasably retains the body 20 in its predetermined mounting position within the tank and with the axis thereof extending in a generally vertical direction. The illustrated bracket 38 is formed from flat metal, has a generally U-shaped configuration, and includes a pair of vertically spaced apart and horizontally extending legs 40, 40. Each leg 40 has a recess 42 opening through one side thereof which receives an associated portion of the body 20 therein. Each leg 40 engages an associated abutment surface 24 to restrain the body against vertical movement relative to the bracket 38. A locking bar 44 is connected to each leg by a pivot pin 46 for pivotal movement between locking and releasing positions, respectively, shown in full and broken lines in FIG. 3. Each locking bar is releasably retained in its locking position by a fastener or cotter pin 48. The locking bars 44, 44 cooperate to releasably retain the body 20 in assembly with the mounting bracket 38 which may be welded or otherwise secured to a wall of the tank 12 with suitable fasteners.

The float 17 is generally cylindrical and has a coaxial central bore 50 which receives the body 20 therethrough. The illustrated float 17 is molded from synthetic rubber and has a bore 50 defined by a coaxial tubular sleeve 52 of fiberglass or like material which closely surrounds the tubular body 20 to facilitate axial sliding movement therealong. As previously noted, the float 17 has one or more magnets associated therewith and, as shown, comprises four coaxially arranged bar magnets 18, 18 mounted in the float 17 with the longitudinal axes thereof generally parallel to the axis of the body 20. The magnets 18, 18 are secured in the float 17 by colored epoxy material indicated at 56, which also serves to identify the top of the float for assembly purposes.

Figure 5:
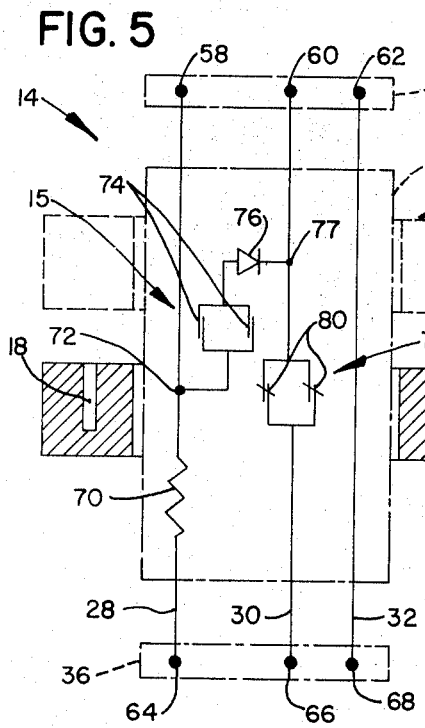
FIG. 5 is a schematic side elevational view of the liquid level indicating station of FIG. 2.

The arrangement of the circuit associated with the indicating station 14 is best shown in FIG. 5 wherein the station is illustrated somewhat schematically. The conductors 28, 30 and 32, respectively, include upper terminals 58, 60 and 62 located within the upper connector 34 and lower terminals 64, 66 and 68 located in the lower connector 36. A resistor 70 is connected with the conductor 28 in series with the terminals 58 and 64. The conductor 28 also defines a junction 72 between the resistor 70 and the upper terminal 58. Preferably, and as shown, the upper switch 15 comprises a pair of switches 74, 74 connected in parallel relationship for redundancy. The switches 74, 74 are, in turn, connected in series with a diode 76 between the junction 72 and another junction 77 defined by the conductor 30. The station 14 also includes a lower switch indicated generally at 78 and contained within the body 20 for connecting the station 14 with one or more successive stations of like kind. In the illustrated case, for the purpose of redundancy, the lower switch 78 includes a pair of switches 80, 80 connected in parallel relation to each other and in series with the conductor 30 between the junction 77 and the lower terminal 66. The conductor 32 extends through the body 20 to provide electrical continuity when the station 14 is connected in a three-wire system with other stations of like kind.

Referring again to FIG. 2, the circuit components which comprise the aforedescribed indicating circuit are preferably mounted on a printed circuit board 82 which is, in turn, mounted in fixed position within the housing 20 and further secured therein by a suitable potting compound 84 such as an epoxy resin. The magnetically actuated switches 74, 74 and 80, 80 are preferably of the well known reed type which comprises elongated magnetically responsive reed contacts hermetically sealed within an envelope of glass or like insulating material. The lower switches 80, 80 are disposed along the axial path of the float 17 of the body 20 and mounted so as to be within the magnetic influence of the magnets 18, 18 when the float 17 is in its lower or full line position of FIGS. 2 and 15. The tap switches 74, 74 are mounted in like manner along the float path and above the switches 80, 80 and are positioned so as to be within the magnetic influence of the magnets 18, 18 when the float 17 is in its upper or broken line position. The switches 80, 80 and 74, 74 are further arranged so that all of the switches are simultaneously within the magnetic influence of the magnets 18, 18 during a fraction of the travel of the float 17 along its path between its upper and lower positions. The illustrated switches 74, 74 and 80, 80 are all of a normally open type and attain closed contact condition when disposed within the flux path of the magnets 18, 18.

Figure 6:
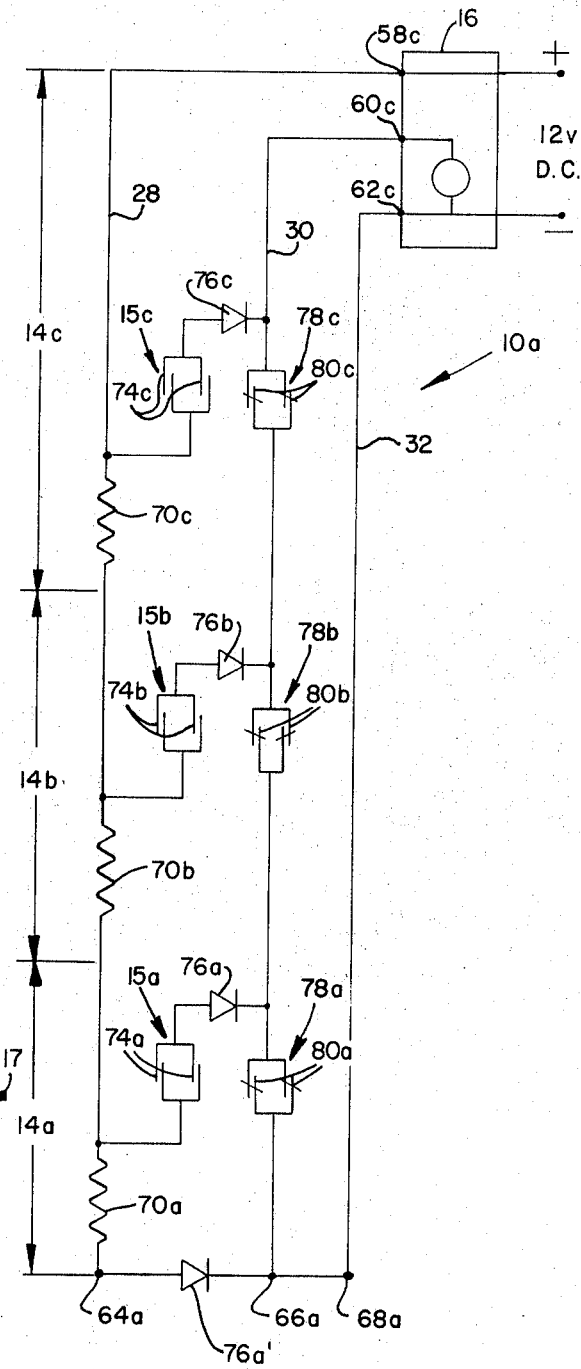
FIG. 6 is a simplified schematic diagram of the circuit embodied in the apparatus of the present invention.

Considering now the operation of the apparatus and referring particularly to FIG. 6 of the drawings, wherein a typical apparatus 10a is shown to comprise a plurality of indicating stations 14, 14 connected together in electrical series and arranged in vertically spaced relationship, the various stations being differentiated by subscripts a–c, inclusive, for convenience of description. A diode 76a' is connected between the lower terminals 64a and 66a of the lowermost station 14a. The terminal 66a is, in turn, connected to the terminal 68a, as shown. The upper terminals of the station 14a are connected to corresponding lower terminals of the station 14b and in like manner, the upper terminals of the station 14b are connected to corresponding lower terminals of station 14c, but for clarity of illustration, the latter connecting terminals are not shown in FIG. 6. The upper terminals of the station 14c are connected to a receiver 16a which provides a D.C. power source and includes a suitable meter of well known voltage or current sensitive type. In the illustrated case, the receiver 16a preferably includes a suitable volt meter for indicating voltage drop as determined by the voltage divider formed by the stations 14a–14c, but calibrated to indicate gallons or the like. In FIG. 6, the apparatus 10a is shown in a condition which corresponds to a dry or empty tank condition, the various switches associated with the stations 14a–14c being in the condition shown, each float being in its lower position to maintain associated lower switches 78a–78c in closed contact condition. As the tank is filled, the level of liquid therein rises and ultimately causes the float associated with the station 14a to move from its lower position toward its upper position. During a fraction of float upward travel, all of the switches 74a, 74a and 80a, 80a are within the magnetic influence of the float and simultaneously closed. However, when the upper switches 74a, 74a close, a tap circuit is established through the latter switches which change the voltage output of the divider circuit to indicate that the level of the liquid in the tank has risen to the height of the station 14a. When the float associated with the station 14a attains its upper position, the switches 80a, 80a are in open condition, but the switches 74a, 74a remain closed. The meter reading at the receiver 16a will not again change until the level of the liquid in the tank raises to the height of the float associated with the station 14b.

During the interval in which the level of the liquid in the tank is between the stations 14b and 14a, the lower switches 80b, 80b remain in closed position to carry the signal from the station 14a therebelow. As previously described, when the level of the liquid reaches the station 14b, the float associated therewith moves upwardly. The switches 74b, 74b close before the switches 80b, 80b open and establish a tap circuit above the resistor 70b, which causes the receiver to indicate that the level of the liquid in the tank has risen to the height of the station 14b. The diode 76b functions during the interval when all of the switches associated with station 14b are closed to assure that the highest voltage signal which signifies the highest liquid level attained within the tank is indicated at the receiver 16a. In the absence of the diode 76b, the receiver 16b will indicate an average voltage value determined by the stations 14b and 14a during the interval while all of the switches associated with the station 14b are in closed position. The upper switches 74b, 74b, of course, indicate that the level of the liquid in the tank has reached the level at which the station 14b is mounted.

Further considering the apparatus 10a, the various stations 14a–14c may, if desired, be electrically interconnected by suitable releasable connectors which provide substantially fluid type connection therebetween to maintain the terminals therein in dry condition. When the stations are to be connected in the aforedescribed manner, the connectors 34 and 36 associated with a typical indicating station 14, shown in FIG. 2, may comprise a plug and receptacle. However, in accordance with the presently preferred construction, the various terminals which provide connection between the electrical conductors associated with the stations 14a–14c are spliced together at junctions contained within unitary connectors molded on or otherwise integrally connected to the flexible conduit portions. Thus, the connectors 34 and 36, shown in FIG. 2, preferably comprise molded unitary structures which contain spliced terminal connections. The illustrated connectors 34 and 36 are molded to the conduit portions after the conductors 28, 30 and 32 have been spliced to corresponding conductors of associated indicating stations and serve to encapsulate the terminal connections or junctions therebetween.

As previously noted, the lowermost station 14a is provided with a diode 76a' which is preferably located within a lower connector, such as 36 (FIG. 2). The latter connector is preferably molded and comprises a blind connector which encapsulates the diode 76a' and the junctions 64a, 66a and 68a. The preferred construction permits the apparatus 10a to be assembled in the field from a plurality of substantially identical indicating stations 14, 14. The stations may, if desired, be provided with flexible conduit extensions which may be cut to desired length, spliced, and encapsulated in molded connectors such as 34 and 36 in the field. Since each indicating station comprises a substantially discrete electrical unit, a defect in a particular station will normally be indicated at the receiver 16, so that trouble in the apparatus may be readily isolated. When the apparatus is formed from integrally connected units, as hereinbefore described, a defective station may be removed from the apparatus and replaced by simply cutting the electrical conduit to remove the defective station and splicing in a new station, all of which may be readily accomplished in the field.

The sensitivity of the apparatus will be determined by the number of indicating stations provided and the vertical spacing therebetween. The capacity curve of the tank 12, shown in FIG. 1, is non-linear, as is common on most ships, therefore, even increments of tank height do not correspond to even increments of liquid or fuel quantity. However, the apparatus 10 may be readily calibrated by positioning the various stations at uneven intervals along the wall of the tank so that the increments between stations correspond to a uniform increment of fuel quantity. The sensitivity of the apparatus at critical points may be increased by providing additional stations or decreasing the spacing between stations at critical points, as for example, near the bottom and top of a fuel tank or the like. The apparatus of the present invention may also be arranged to provide continuous monitoring from a predetermined point above the bottom of a tank to the top thereof. Thus, any selected increment of tank depth may be separately indicated for overflow protection or other specific requirements. Since the apparatus is operated by floats which ride at liquid level, meter readings are substantially independent of variations in the specific gravity of the liquid monitored.

I claim:

1. A liquid level indicating apparatus comprising a plurality of discrete liquid level indicating stations arranged in generally vertical series in a liquid container, each of said stations having an elongated body, means for mounting said body in fixed position in the container with the longitudinal axis of said body extending in a generally vertical direction, a float supported for limited travel along an axial path relative to said body between lower and upper positions, a magnet carried by said float, a flexible electrical conduit integrally connected to said body and having elongated opposite end portions extending therefrom, said conduit at least partially defining first and second electrical conductors extending through said body, said first and second conductors having first and second upper terminals, respectively, at one end of said conduit and first and second lower terminals, respectively, at the opposite end of said conduit, said first and second conductors, respectively, defining first and second junctions in said body, a plurality of electrical components in said body including a resistor connected in series with said first conductor between said first lower terminal and said first junction, a magnetically responsive normally open lower switch mounted along said axial path and connected in series with said second conductor between said second lower terminal and said second junction, said lower switch being maintained in closed circuit condition by magnetic influence of said magnet when said float is in its lower position, said lower switch being in open circuit condition when said float is in its upper position, and a magnetically responsive normally open upper switch mounted along said axial path above said lower switch and connected in series between said first and second junctions, said upper switch being in open circuit condition when said float is in its lower position and maintained in closed circuit condition by magnetic influence of said magnet when said float is in its upper position, means connecting said plurality of stations in electrical series to define a voltage divider, each of said stations in said series having said first and second lower terminals thereof connected, respectively, to said first and second upper terminals of a successive station in said series, and means connected to said voltage divider for sensing change in the electrical condition thereof.

2. A liquid level indicating apparatus as set forth in claim 1 wherein both said lower and upper switches of each one of said stations are simultaneously in closed circuit condition during a fraction of the travel of said float associated with said one station and said plurality of circuit components associated with said one station includes a diode connected in series with said upper switch thereof between said first and second junctions.

3. A liquid level indicating station comprising an elongated body, means for mounting said body in fixed position in a liquid container with the longitudinal axis of said body extending in a generally vertical direction, a float supported for limited travel along an axial path relative to said body between lower and upper positions, a magnet carried by said float, a flexible electrical conduit integrally connected to said body and having elongated opposite end portions extending therefrom, said conduit at least partially defining first and second electrical conductors extending through said body, said first and second conductors having first and second upper terminals, respectively, at one end of said conduit and first and second lower terminals, respectively, at the opposite end of said conduit, said first and second conductors defining, respectively, first and second junctions in said body, and a plurality of electrical components in said body including a resistor connected in series with said first conductor between said first lower terminal and said first junction, a magnetically responsive normally open lower switch mounted along said axial path and connected in series with said second conductor between said second lower terminal and said second junction, said lower switch being maintained in closed circuit condition by magnetic influence of said magnet when said float is in its lower position, said lower switch being in open circuit condition when said float is in its upper position, and a magnetically responsive, normally open upper switch mounted along said axial path above said lower switch and connected in series between said first and second junctions, said upper switch being in open circuit condition when said float is in its lower position and maintained in closed circuit condition by magnetic influence of said magnet when said float is in its upper position.

4. A liquid level indicating station as set forth in claim 3 wherein both said lower and said upper switches are simultaneously in closed circuit condition during a fraction of said float travel between said positions and said circuit components include a diode connected in series with said upper switch.

5. A liquid level indicating station as set forth in claim 3 wherein said means for mounting said body comprise a mounting bracket which includes means to releasably retain said body in assembly therewith.

6. A liquid level indicating station as set forth in claim 5 wherein said body includes enlarged end portions defining opposing abutment surfaces and said abutment surfaces engage said bracket to restrain said body against axial movement relative thereto.

7. A liquid level indicating station as set forth in claim 6 wherein said means to releasably retain said body comprises latch means mounted on said bracket to pivot between latched and released positions.

8. A liquid level indicating station as set forth in claim 3 wherein at least one of the switches comprises a pair of reed switches mounted in side-by-side relation and connected in electrically parallel relation with each other.

9. A liquid level indicating station as set forth in claim 8 wherein each of said switches comprises a pair of reed switches mounted in side-by-side relation and connected in electrically parallel relation with each other.

10. A liquid level indicating station as set forth in claim 3 wherein said conduit at least partially defines a third electrical conductor which extends through said body.

11. A liquid level indicating station as set forth in claim 3 wherein said body comprises a generally cylindrical member and said float comprises an annular member having a coaxial bore receiving said cylindrical body member therethrough.

12. A liquid level indicating station as set forth in claim 3 including a printed circuit board mounted in said body and partially defining said conductors, said circuit components being mounted on said circuit board.

13. A liquid level indicating station as set forth in claim 3 and including means for releasably connecting said station in electrical series with other stations of like kind.

14. A liquid level indicating station as set forth in claim 13 wherein said connecting means comprises an electrical connector integrally connected to an associated end of said conduit and supporting said terminals associated therewith.

* * * * *